(12) United States Patent
Flynn et al.

(10) Patent No.: US 8,503,052 B2
(45) Date of Patent: Aug. 6, 2013

(54) SECURITY HOLOGRAMS

(75) Inventors: Patrick Flynn, Halstead (GB); John David Wiltshire, Colchester (GB)

(73) Assignee: Ver-Tec Security Systems Limited, Halstead (GB)

( * ) Notice: Subject to any disclaimer, the term of this patent is extended or adjusted under 35 U.S.C. 154(b) by 757 days.

(21) Appl. No.: 12/599,403

(22) PCT Filed: May 7, 2008

(86) PCT No.: PCT/GB2008/050334
§ 371 (c)(1),
(2), (4) Date: Apr. 22, 2010

(87) PCT Pub. No.: WO2008/139220
PCT Pub. Date: Nov. 20, 2008

(65) Prior Publication Data
US 2010/0195175 A1   Aug. 5, 2010

(30) Foreign Application Priority Data

May 11, 2007   (GB) .................................. 0709110.1

(51) Int. Cl.
*G03H 1/00*   (2006.01)
*G03H 1/20*   (2006.01)
*G03H 1/04*   (2006.01)

(52) U.S. Cl.
USPC ................................... 359/2; 359/12; 359/35

(58) Field of Classification Search
USPC .................... 359/2, 12, 22, 26, 28, 35; 430/2
See application file for complete search history.

(56) References Cited

U.S. PATENT DOCUMENTS

| 6,309,735 | B1 | 10/2001 | Ueda et al. |
| 6,822,769 | B1 | 11/2004 | Drinkwater et al. |
| 7,154,647 | B1 | 12/2006 | Takabayashi et al. |
| 7,961,367 | B2 * | 6/2011 | Ha .................................. 359/35 |
| 2007/0206248 | A1 * | 9/2007 | Winterbottom et al. .......... 359/2 |
| 2010/0027082 | A1 * | 2/2010 | Wiltshire .......................... 359/2 |

FOREIGN PATENT DOCUMENTS

| EP | 0 283 233 A | 9/1988 |
| WO | WO 92/09444 A | 6/1992 |
| WO | WO 2005/034019 A | 4/2005 |

OTHER PUBLICATIONS

International Search Report for corresponding PCT/GB2008/050334, Completed Sep. 23, 2008 by Pierre Noirard of the EPO.

* cited by examiner

*Primary Examiner* — Alessandro Amari (57) ABSTRACT

We describe techniques for recording a holographic image onto holographic recording film, in particular for security holograms. We thus describe a structure having a stack comprising the holographic recording film and a multichannel image generation device under the film. A three-dimensional object (or hologram of a 3D object) is provided, located under the multichannel image generation device. At least a portion of the multichannel image generation device is substantially transparent or absent in a region above the object. A holographic image is recorded in the film by illuminating the stack with laser light. The multichannel image generation device under the film may comprise a volume reflection hologram of a lenticularly generated image. The structure records a hologram of the 3D object in conjunction with a multi-channel holographic image.

6 Claims, 7 Drawing Sheets

SECURITY HOLOGRAMS

FIELD OF THE INVENTION

This invention relates to methods of recording a holographic image onto holographic recording film, to film bearing recorded holographic images, and to apparatus for recording a holographic image onto film. The techniques we describe are particularly useful for security holograms.

BACKGROUND TO THE INVENTION

Volume reflection holograms have been mass-produced in the past, predominantly in monochromatic form, by companies such as Applied Holographics plc, Third Dimension Ltd., and Du Pont Authentication Systems inc., by a process of contact copying of image-planed master holograms. These master holograms have generally been created by one of two alternative techniques.

One technique involves the production of second-generation (H2) contact masters from redundant first generation (H1) recordings where the recording of subject matter distant to the recording plate enables multiple channels of image information to be recorded in the H1 such that image-switching effects occur when the second generation hologram is viewed by a viewer's eye, effectively through the window of the virtual H1. This technique is commonly used in holography and is similar to the method used to create classical embossed hologram masters. It is referred to as 'conventional H1/H2 mastering', or 'split beam holography' and follows the published work by Upatnieks and Leith in the 1960's.

A second technique allows for the initial recording of a first generation master hologram especially in a medium such as dichromated gelatin, whose grainless clarity, low absorption, and high maximum diffraction efficiency capability enable the preparation of a near-field recording with exceptional brightness and a very wide window of view. This type of hologram where a hologram recording of an image from an object or a master hologram is made with the use of only one expanded laser beam, such that the single beam acts both as the reference beam for the hologram and also gives rise to the object beam when reflected back from an object or hologram, is called a 'Denisyuk' or 'single-beam' hologram.

The first of these techniques leads to bright multi-channel images which have been criticised by some observers for their limited viewing angle, equivalent to a window of the same size as the H1 master, spaced some distance from the final hologram.

The latter method, however, provides a very wide viewing angle since a master, typically of the same size, may be placed in this case very close to the subject matter. Thus the viewing window of this system may be equivalent to almost a complete hemisphere. However this type of master does not possess the capability to provide animation, or image switching, and because light is diffracted into such a wide viewing zone by this technique the image brightness as perceived from any particular viewing position will tend to be less than with the former method of mastering.

It is nonetheless desirable to be able to record multiple different holographic images in a single recording medium, especially for security applications. It is also desirable to be able to record images onto flexible film rather than rigid glass plates for many reasons including cost and ease of mass production. However the flexible nature of film provides some special challenges which can make recording of holographic images, especially multiple images for security purposes, difficult in practice.

One specific problem associated with recording holograms into film as compared with a glass substrate arises because typically the film must be held substantially motionless (say to better than a quarter wavelength) for a relatively long period whilst the hologram is recorded. This is difficult because film is not rigid. A further problem arises because the hologram emulsion tends to be cloudy, especially towards the blue end of the spectrum, and this can also make the recording of multiple different holographic images into a single film hologram difficult.

SUMMARY OF THE INVENTION

According to a first aspect of the invention there is therefore provided a method of recording a holographic image onto holographic recording film, said holographic image comprising a hologram of a three-dimensional (3D) object in conjunction with a multi-channel holographic image, the method comprising: forming a holographic recording stack by: positioning said holographic recording film over a multi-channel image generation device; positioning at least one three-dimensional (3D) object or hologram of a 3D object (ie positioning a real 3D object or a or virtual holographic object) under said multichannel image generation device; and providing a transparent window in said multichannel image generation device in a region above said at least one object; and then recording said holographic image in said holographic recording film by illuminating said stack through said holographic recording film with a laser light of at least one wavelength.

In embodiments such a method enables the fabrication of a hologram of a three-dimensional object in combination with a multi-channel holographic image, in particular without the image of the 3D (real or virtual) object being obscured by the replay image from the multi-channel image generation device. Further by locating the 3D object under the multi-channel image generation device the multi-channel image generation device can support the holographic recording film whereas if the 3D object were uppermost in the stack (from the point of view of the illuminating or reference beam) it would be difficult to support the film in such a way that it did not drape over the object.

In some preferred embodiments the multi-channel image generation device comprises a multi-channel volume reflection hologram and thus the recording of the holographic image into the film comprises replaying the multi-channel image from this volume reflection hologram and recording the replayed image in the film. In embodiments the multi-channel volume reflection hologram is a second generation hologram (H2 or "H2 master") since this facilitates the provision of multiple channels; in embodiments therefore the hologram in the film is a third generation (H3) hologram. In embodiments the H2 hologram may comprise multiple sets of alphanumeric characters or lettering or other images recorded through an H1 master with different, limited angles of view.

Preferably the multi-channel volume reflection hologram comprises a holographic plate and this could be holographic film laminated on a clear glass plate since this facilitates a high diffraction efficiency. This is important because in effect this H2 hologram provides the object beam for the recording film and, broadly speaking, the object and reference beams should be of similar brightness so that, broadly, the brightness of replay from the H2 hologram determines the brightness of the image recorded in the film. In some preferred embodiments one or more images replayed by a multi-channel volume reflection hologram are substantially planar. Thus embodiments of the method comprise locating a replay image of the multi-channel holographic image (from H2) by the film in a different plane to the hologram of the 3D object replayed by the film. Use of the multi-channel volume reflection hologram facilitates control of the plane of the replay image by this hologram, and hence by the H3 recording film, for example by around +/−5 mm or less. Choosing different planes for the 3D object and one or more replay images originating from a multi-channel volume reflection hologram helps to provide increased security.

In some preferred embodiments one or more of the images replayed by the film are substantially planar with respect to the surface of the film; preferably the replay field is substantially flat with collimated light; this facilitates locating replay images at different vertical distances within the replay field. In embodiments of the above-described method the images replayed by the film are approximately localised according to a 2D position on the surface of the film—that is, when viewed, they appear to have a 2D spatial position which corresponds with location on the surface of the film. Thus in some preferred embodiments an image generated by the multi-channel image generation device and the hologram of the 3D object are, when viewed, substantially spatially disjoint. In embodiments the replay of the 3D object by the film and the replay of one or more of the multi-channel images are substantially non-overlapping (at least from one viewing direction).

In embodiments of the method the 3D object has a limited height, for example less than 6 mm, to facilitate a high quality recording and may, for increased security, have a surface relief pattern on an upper surface (towards the illuminating or reference beam). In embodiments the surface relief pattern provides edges which help to give the impression of a crisp replay image (again important for security).

The skilled person will understand that in embodiments of the above-described method the steps of forming the holographic recording stack may be performed in any order. The holographic recording film may comprise a recording medium such as (but not limited to) silver halide or photopolymer. In the case of silver halide preferably fine grain film, for example film of monodisperse grain diameter 15 nm, is employed to reduce blue scattering. Such film is available, for example, from Colour Holographic Ltd, London, UK, and with a slightly larger mean grain size, Fujifilm Hunt Chemicals Inc, USA. By providing a transparent window in the multi-channel image generation device above the object the replayed multi-channel holographic image may be substantially non-overlapping with the image of the 3D object and, more particularly, a clear replayed image of the 3D object may be formed (as previously mentioned without such a window the replayed image of the 3D object tends to be dim and fuzzy, lacking clarity). Where the multi-channel image generation device comprises a multi-channel volume reflection hologram such a transparent window may be provided by removing a portion of the hologram recording material in the region above the 3D object. Where the multi-channel image generation device comprises a lenticular image generation device (as discussed further below) such a window may be provided by omitting lenticular lenses from a portion of the device either to provide an aperture in the device or, more preferably, to provide a planar, substantially transparent window (i.e. lacking lenses) above the object.

One example of a multi-channel image generation device is a lenticular image generation device which, broadly speaking, comprises an array of longitudinal lenses behind which is located a printed image such that when the lenticular device is viewed from different angles different pictures are seen (because different parts of the underlying image are viewed. Broadly the image under the lenticular device comprises a set of interlaced stripes, the stripes belonging to different viewed pictures. Such a multiplexed lenticular imaging device could contain stereographic depth or animation within the perceived image.

The multi-channel image generation device may, as previously mentioned, comprise a multi-channel volume reflection hologram but this hologram may comprise a hologram of a lenticularly generated image. Alternatively the multi-channel image generation device may itself comprise a lenticular image generation device. In both cases, however, embodiments of the method avoid the need for multiple hologram recording exposures which could otherwise arise with such a device (and which cause considerable difficulties in practice). The skilled person will understand that even where the multi-channel image generation device comprises a lenticular, nonetheless the corresponding image replayed by the recording film comprises a holographic image. The multi-channel imaging device could also comprise some other diffractive or refractive device such as a partially silvered mirror or a partially silvered transmission hologram where the silvering (often sputtered aluminium metal) has been selectively removed ("demetallisation") in the area of the three-dimensional object.

In embodiments of the method the hologram recording stack includes two or more multi-channel image generation devices. This facilitates a "mix and match" approach to fabricating a complex security hologram with considerable cost and time saving over an approach which fabricates separate masters for different desired replay image combinations in the recording film. Potentially the 3D object may be a virtual 3D object, itself generated by a hologram, but preferably a real, physical 3D object is used. For example a 'Denisyuk' master hologram, precisely 'colour-tuned' by chemical means to replay its image in the exact colour of the copying laser (or lasers), is in many ways almost equivalent to the original object in this context and has very similar qualities of realism and angle of view when its image is transferred into the final H3 hologram. In this case the hologram plate, unlike a solid object, despite its high reflectivity, is not opaque and steps are taken to block out any background image which would otherwise be seen through the space in which the object apparently resides. This may be by means of an opaque masking material attached behind the plate bearing the 3D image, or in front of the plate bearing the image layer which reconstructs the background to the object, or it may be by removal of the gelatin emulsion bearing any background image which would normally be obscured by a solid 3D object.

In preferred embodiments multi-channel volume reflection hologram comprises a multicolour, preferably full colour hologram. Preferably the holographic image recorded in the film also comprises a full colour (i.e. red, green and blue) hologram. This may be fabricated using a "multi-colour laser" (the inventors term this a "white" laser beam), that is a laser beam in which red, green and blue beams are combined on a single axis, for example using dichroic mirrors or beam splitters (although other techniques may be employed to generate such a "multi-colour laser"). Embodiments of the method we describe are especially useful for blue light since scattering from particulates in silver halide emulsion is enhanced at short wavelengths, and thus embodiments of the method we describe are particularly useful for fabricating full colour holograms. The skilled person will understand that for the holographic image to be a full colour holographic image not every part of the holographic image needs to be full colour; it is enough that the holographic image taken as a whole, that is including the hologram of the 3D object and the multi-channel holographic image, is full colour.

Embodiments of the method are particularly useful for mass producing a hologram in holographic recording film. In such a mass production technique the film may be transported over the multi-channel image generation device and 3D object by a step-and-repeat drive, recording a hologram at each step. Where the multi-channel image generation device comprises a hologram, preferably the emulsion of this hologram is away from the film (on the surface of a substrate of the H2 plate opposite a surface facing the film) to reduce the risk of scratching the emulsion of the H2 plate. Preferably the emulsion of the film faces downwards (away from the illuminating beam) as this results in an image, when replayed, is the right way around (right-reading and orthoscopic, when the typical recording conditions for holography have been utilised.)

In some cases we have found advantageous effects in the creation of a pseudoscopic image reconstruction by inversion of the master hologram in conjunction with a first casting of a model which thus itself has inverted perspective. This condition can still be achieved by recording and replaying the H2 master with its emulsion reversed, i.e. retaining the glass surface on the upper side despite the fact that the image is reversed in perspective. When a "pseudoscopic" image is created by the mastering stack, then the recording film may be reversed so that the emulsion side is not adjacent to the master, so that a further reversal of the film layer before viewing will cause the image to revert again to its orthoscopic state.

The invention also provides a hologram recorded using a method as described above.

Thus in a further aspect the invention provides a hologram recorded in holographic recording film, said hologram replaying a holographic image comprising a hologram of a three-dimensional (3D) object in conjunction with a multi-channel holographic image.

The invention also provides apparatus for use in recording a holographic image, in particular as described above.

Thus in a still further aspect the invention provides a structure for recording a security hologram in holographic recording film, said holographic image comprising a hologram of a three-dimensional (3D) object in conjunction with a multi-channel holographic image, said structure forming a stack comprising: said holographic recording film; a multichannel image generation device under said holographic recording film; at least one 3D object under said multichannel image generation device; and wherein at least a portion of said multichannel image generation device is substantially transparent or absent in a region above said at least one object.

In embodiments the again multi-channel image generation device is substantially transparent or absent from a region above the object, thus providing a transparent window for illuminating the object beneath. In embodiments this window is substantially free of optical distortion and may comprise, for example, a transparent plate. Preferably the window extends over substantially a complete region or regions above the at least one object or each object to be recorded.

According to a further aspect of the invention there is provided a modular master hologram stack, the stack comprising a holder configured for interchangeable support of at least one or two multichannel image generation devices, further comprising a reservoir to contain refractive index matching fluid between said multichannel image generation devices, and a support for at least one 3D object beneath said multichannel image generation devices.

Preferably the stack includes a holder configured for interchangeable support of at least two multi-channel image generation devices, and a support for the at least one 3D object beneath these devices. The holder is also configured to contain refractive index matching fluid between these multi-channel image generation devices, for example by sealing around the edges of the devices to provide a reservoir to contain this fluid between the devices. One index matching fluid which may be employed is white spirit but preferably a transparent oil which does not significantly effect the emulsion is used, for example Cedar oil. Preferably the holder is also arranged to contain such index matching fluid between the 3D object and an adjacent multi-channel image generation device.

In the case of security masters which are to be preserved for repeated or archival use, we have found that the index matching fluid may be replaced with a u.v. curing resin such as Glassbond by Loctite UK, Welwyn G. C., England. After alignment and testing, the components can be exposed to u.v. radiation so as to produce a permanent stack for use as a permanent contact master.

Preferably the stack incorporates a film holder such as a vacuum chuck or a mobile glass pressure plate able to hold the film substantially planar and motionless to less than 100 nm for a period of at least 1 ms, preferably for at least 10 ms, 100 ms, 1000 ms or greater. Preferably a total height of the stack is less than about 1 cm to facilitate the hologram recording process. As previously noted, a transparent window in a multi-channel image generation device such as a volume reflection hologram may be provided by omitting a portion of the device to provide a substantially transparent plate or to provide an aperture in a region above the object.

Optionally a passive image display device (that is a device which does not itself emit light) such as a spatial light modulator (SLM) or a digital micromirror device (DMD) may be incorporated beneath or in place of the 3D object in the stack. This enables, for example, a unique number or other identification to be recorded in the film at the same time as recording the holographic image. In this case a further laser beam coherent with the reference (copying) laser beam may be introduced to enhance the brightness of the SLM or DMD image.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

We will describe techniques for incorporating a hologram of a three-dimensional (3D) object into a hologram in conjunction with a multi-channel holographic image so that on replay, depending upon the viewing conditions, the hologram of the 3D object and/or one or more channels of the multi-channel image are viewable. In this context a multi-channel image comprises an image in which one or more of image colour, image information content, and image parallax vary with the relative positions of the illumination, hologram and viewer. For example, typically, different viewing angles generate different images. In embodiments, the techniques we describe allow for the replacement of an 'H2' contact master hologram with a complex array of image forming components arranged in layers of depth so as to allow each to provide high diffraction efficiency image components in a mass produced hologram.

Figure 1:
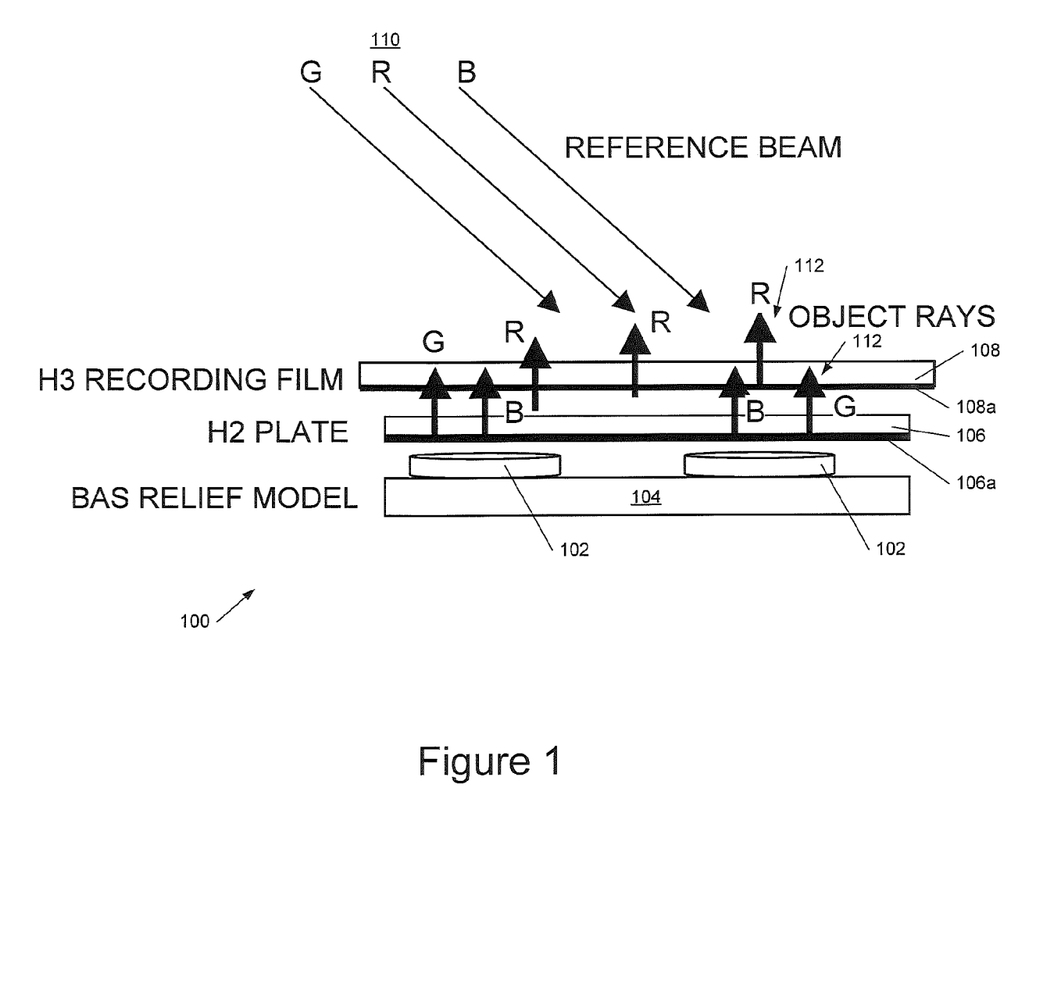
FIG. 1 shows an embodiment of a hologram recording system according to an aspect of the invention.

Referring to FIG. 1, this shows an embodiment of a hologram recording system 100 according to an aspect of the invention. The system comprises one or more metal bas-relief models or objects 102 on a support 104. An H2 hologram such as an H2 contact master hologram 106 is located over the models or objects 102, preferably with the emulsion 106*a* downwards (where "upwards" is towards the reference beam). Third generation hologram (H3) recording film 108 is located above the H2 plate 106, again preferably with the emulsion 108*a* facing downwards. A "white" (i.e. red, green and blue) reference beam 110 impinges upon the stack 100 and generates reflected or returned beams 112 travelling generally upwards (the red component passing through film 108, the green and particularly the blue components being attenuated). A portion of the emulsion layer 106*a* of the H2 plate 106 is removed in a region corresponding with objects 102, as illustrated more clearly in later figures.

A bas-relief model, that is an object coated with metal with a surface relief pattern formed, for example, by carving or etching, is capable of producing a strong image when illuminated in a "Denisyuk" single beam mode. The metallic surface is also partially or substantially polarisation preserving. Control of the ratio of object and reference beam intensities can be used during manufacture of the H2 plate to provide bright colour component images, hence facilitating high image brightness in the H3 recording film 108.

Continuing to refer to FIG. 1, if objects 102 were, say, in front of the H2 plate 106 the planar surface supporting the H3 recording film would be disrupted creating difficulties in holding this film layer motionless for the (contact) copying process. This is particularly a problem for mass production. Locating the objects beneath the H2 plate and providing an aperture in the recording emulsion addresses this problem: It might be imagined that the stack, including the bas-relief model, could be covered with a supplementary anti-reflection coated glass plate, but this is unsatisfactory since it forces additional image depth to be recorded into the final hologram with unsatisfactory implications for image clarity in poor, for example fluorescent, lightning.

In operation, the H3 hologram is illuminated, with the recording film overlaid on the H2 plate, by a diverging or collimated white reference beam. The reconstructed holographic image, comprising rays of light reflected in the returning direction from the H2 then forms an object beam for the H3 recording. Interference with the incoming reference light then creates a fringe structure which gives rise to the H3 recording.

If a number of layers of image forming components for the individual image components are used, the component plates may be arranged as an array with a mechanical means of support such as a slide-in racking system (thus also facilitating image register). Index matching of the layer, or at least coupling of the individual layers, with suitable fluid, allows one to predominantly eliminate internal reflections from the glass surfaces and remove unsatisfactory Newton's rings from the recorded H3 image, and also to avoid wastage of laser light to ensure increased diffraction efficiency in the copy hologram. The image is a hybrid of the components of all of the layers.

In addition to the metal, or metallised, preferably bas-relief objects, in a system with multiple H2 plates (or other devices) one may record (or otherwise provide) one or more colour components in each of the plates and select the priorities for image components to have maximum brightness of visibility as regards their individual level of importance to the image. For example one may record a foreground in one plate and a background in another plate, or for another specific graphic design one may decide to record two colour components in the one plate where one component of each colour is associated with the foreground and one with the background plane. In some cases it is possible that two image components which reconstruct in the same plane or level of the final holographic image could be recorded in two separate layers at different levels of the stack, their different postions of depth within the stack being compensated by the degree of projection of their image from their respective H2 master plate.

In embodiments of a system for mass production of the H3 holograms the recording film should sit entirely stationary in the exposure gate during the period of the exposure, typically 1-5 seconds (although lower, potentially down to milliseconds for higher laser powers or where line scanning techniques are utilised), and a convenient way to achieve this is by a vacuum chuck system incorporated in the cover glass of the master stack.

In some preferred embodiments the technique uses unique specialist precision cut metallised shapes as the model. For example, these may be in the shape of miniature keys. Thus for example metal, say in the foam of platelets, may be etched or ablated on the surface with a serial number or alpha numeric code. In embodiments the etching is small enough not to be discernable by the unaided human eye but can be read using a magnifier. For example symbols of 50 micron size or less can be laser written into the surface of the metal. The alphanumeric code may be changed by, for example, producing a series of platelets or similar small metal objects. The number code etched into the metal may, for example, indicate different batches of hologram labels, and in embodiments this may cross reference to a database. In this way an inspector in the field can quickly analyse a hologram label; view its number and verify that the specific hologram batch is geographically correctly placed or is attached to the correct product using a link to the database.

In embodiments the technique uses any of a range of modern high-resolution photopolymer materials in this part of the process to fabricate a metal (e.g. Aluminium)-coated resin bas-relief model or object. Some of these photopolymer materials are sold as particularly suitable for high relief models and use of these is preferable as this facilitates the use of purpose-made bas-relief models. For example the surface relief may be up to 0.5 mm or 1 mm deep (possibly even deeper); an optimum thickness may, for example, be determined by experiment. Alternatively a dielectric coating, in particular a multilayer dielectric coating, rather than a metal coating may be employed, for example to facilitate the provision of colour effects. In embodiments microscopic surface detail is created and cast into a suitable moulding material, metallised and incorporated, say, into an array of such devices or models. Such microscopic detail may include microscopic text of for example less than 0.3 mm height. Colouration of these models is also possible.

The type of hybrid image produced by the H3 hologram has the unusual and valuable property that whereas the component of the image associated with the H2 master may have a limited viewing angle resulting from the limited dimensions of the H1 hologram, the metallic model will tend to produce an image viewable from a very wide viewing angle, for example up to 180°.

Furthermore, the three dimensional image from an H2 placed behind the model will appear to form itself around the body of the model component which will form its own appropriate (and desirable) three-dimensional shadow. However, an H2 hologram forming the front layer of the stack may require a "block-out" mask in its origination route, or equivalent emulsion removal as described elsewhere. Conversely, certain subject matter may produce aesthetically pleasing effects when no blocking is provided and the mixing of colours associated with the various image components can be particularly attractive to the eye.

Preparation of a series of planar image components of the type described whether they might be hologram contact masters, shallow relief models, simple optical components, or even complex optical devices such as lenticular displays, or complex electronically addressable spatial light modulators capable of personalisation or enumeration of the individual mass produced hologram, leads to the possibility of a unique "mix and match" image. In other words in embodiments the total graphic image is the product of a series of component images which in themselves may not be unique images, but which in combination provide the customer with a unique image of high security value at low production cost, since certain identical components may be used for a separate customer.

The individual customer can thus be furnished with a unique hologram image compounded from a series of off-the-shelf stock component images. This provides a new concept for the supply of customised holograms to an individual customer, who may thus receive his or her own specialised image created from numerous components, with the option that perhaps just one of these need be purpose-made and may perhaps contain a corporate logo or symbol. In embodiments the result is that the cost of mastering and preparation for a unique production hologram is radically reduced. This reduction of cost associated with the manufacture of a reflection hologram can then be used to offset the potentially increased cost of volume reflection holography recording materials as compared to embossed holography, whose basic foil cost is considerably lower than the live photosensitive material used for reflection hologram mass production.

In embodiments of the technique a stack of H2 hologram plates can be incorporated into the array. A practical difficulty which could arise is that the effect of blue laser light on the silver halide emulsion used to record most of the masters tends to cause scatter. However embodiments of the technique we describe solve this problem.

In embodiments we use a technique, described below, to remove the recording emulsion from the glass plates in an image-wise shape so as to leave only that emulsion which is active as an image source. Otherwise the silver halide crystals (which in the modern superior emulsions are minuscule in comparison with their historic counterparts in the Agfa/Kodak era of the 1970's and 1980's, with grain size in the area of 15 nm diameter) could cause a lack of clarity of the layer by virtue of their tendency to scatter blue light, thus reducing the maximum brightness and raising the level of scatter or haze in the holographic image, For example, if the image is in the style of the 2D/3D format, it is possible to remove the area of emulsion surrounding the foreground graphics so as to leave an active island of emulsion. The clean glass thus exposed on the remainder of the surface does not substantially scatter the laser light during recording.

Figure 2A:
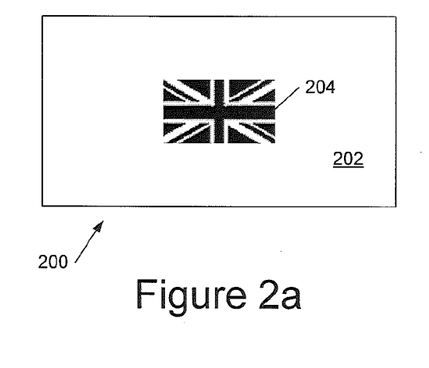
FIGS. 2a to 2f show, respectively, plan and cross-sectional views of a flag hologram, protection of an active zone of the hologram by a mask, the hologram after removal of the mask in plan and cross-sectional views, a bath of gelatin etching solution, and an example volume hologram with a complex planar shape produced by selective removal of recording emulsion.
Figure 2B:
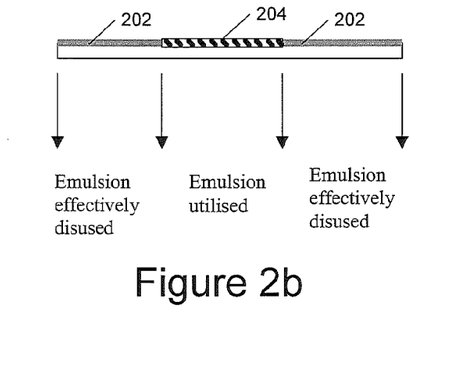

Consider a simple case in which, for example, we have a two-dimensional foreground image such as a flag design where the 2D graphic lies in the surface of the emulsion or just slightly displaced in the adjoining space. Referring to FIGS. 2a and 2b, these show plan and cross-sectional views of such a flag hologram 200. The recording emulsion 202 surrounding the image planed graphic 204 is thus entirely redundant, whilst remaining a source of scatter and attenuation.

Figure 2C:
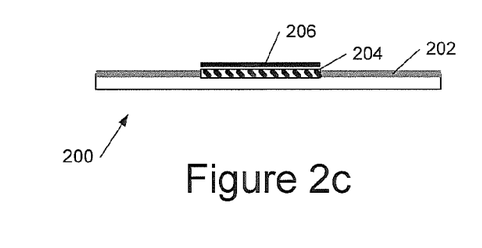
Figure 2D:
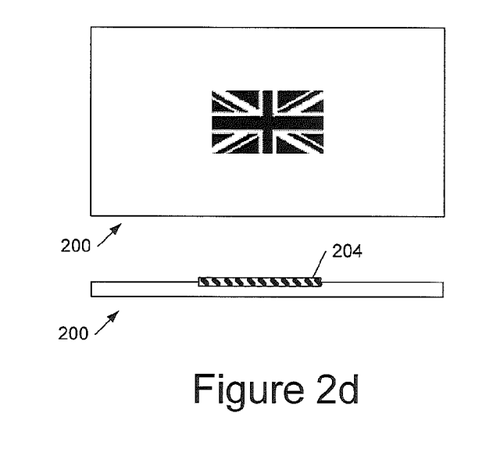

The inventors have found that a solution to this problem is to remove the gelatin emulsion selectively for the redundant areas. The active zone may be protected, for example, with an adhesive mask 206 (for example, PVC adhesive tape), as shown in FIG. 2c. After applying the protective masking to the gelatin layer, the plate can be at least partially submerged in a gelatin solvent such as sodium hypochlorite solution. As soon as the exposed silver halide/gelatin layer had dissolved, the plate is removed from the solvent bath and carefully washed in running water before drying. The resulting plate after removal of the mask, without the scattering surround, is shown in plan and cross-sectional views in FIG. 2d. This plate has an active zone of emulsion 204 with diffractive fringe structure as an island on a clean glass plate.

Following this procedure the hologram may, for example, be laminated with index matching to another plate containing other image colour components or planes, without deletion of the brightness, quality or scattering qualities of the stack.

This technique allows one to form a stack of two or more glass plates without deterioration of the cosmetic image quality whilst allowing the advantage of reducing the data storage capacity of individual emulsion layers by effectively overcrowding the diffractive structures.

Figure 2E:
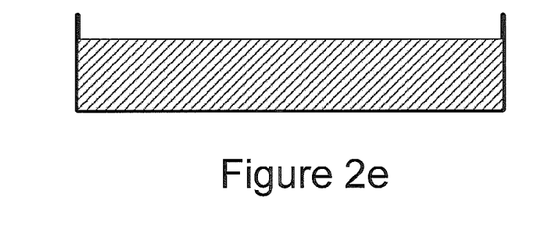

An alternative technique enables selective removal of the gelatin in an image related shape including intricate detail for a case where the planar image component is not in the form of a simple shape such a flag graphic previously described. Here a gelatin etching bleaching process is used. A photo-mask is contact copied onto the plate to allow a heavy exposure to the zones to be removed from the gelatin emulsion in a bath of gelatine etching solution as shown in FIG. 2e.

Figure 2F:
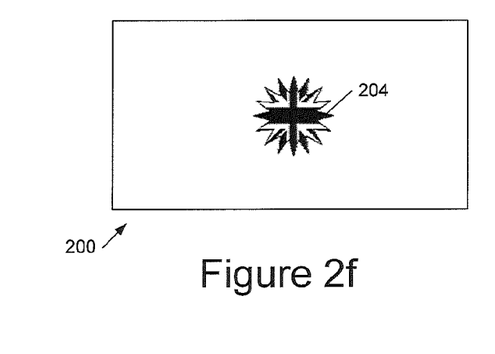

This plate is then developed to high density, for example in excess of 2.0 OD (optical density), using say an ordinary developing process (e.g. using a ~pH 11 ascorbic acid and Metol™ solution). The plate is then bleached with a solution (the gelatine etchant) containing an acidic solution of cupric chloride, more particularly a copper II oxidant, urea and hydrogen peroxide in, say, acetic acid (~pH 3). These compounds enable the silver attacked by the copper to catalyse local, selective attack on the gelatin layer. The effect is to denature the gelatin associated with the black silver metal and to allow this to be released into solution and leave a clean scatter-free glass surface when the plate is carefully dried. The holographic fringes are included in the volume of the complex shape as shown in FIG. 2f and can produce an H3 with detailed parallax interaction with one or more rear planes in the form of holographic transfers or Denisyuk recordings of has-relief models as detailed above. Thus this technique can be used to lithographically impose a (complex) 2D pattern or shape onto a volume hologram.

In some embodiments a lenticular element may be incorporated into the system 100 additionally or alternatively to H2 hologram 206.

One method to achieve this is to produce a lenticular image on a clear substrate such as a transparency film. The image can be 3D, animated or both. The 'interlaced' transparency is laminated to a lenticular lens array. When viewed, the lenticular lens presents different views of a scene to each eye. The brain perceives this as a 3D scene or as an animated image. If the laminated lens is back illuminated with a laser, the scene can be recorded onto a holographic plate. In embodiments, in effect the holographic artwork is replaced with the lenticular element (image). This may be achieved without stereogram techniques which employ multiple exposures onto the holographic plate. Instead a 3D or animated effect may be added in a single exposure.

Thus in embodiments the system provides a lenticular 3D image as a hologram backdrop. By creating a 3D lenticular image on a transparent film base in colour and laminating this to a lenticular screen, it is possible to generate a true colour three dimensional backdrop in a hologram. In addition, it is possible to generate animations using lenticular backgrounds in colour. These lenticular devices may in some cases be additionally lit from the reverse side with a coherent laser beam to enhance brightness. This allows a holographer to produce a stereogram effect in a single exposure rather than multiple exposures. The lenticular screen may be oriented horizontally for up and down animation or vertically for left right or three dimensional effects.

Exposing the lenticular through red, green and blue lasers in sequence, the colour transparency acts as a colour separator and the reconstructed image will also reproduce mixtures of these colours. Such lenticular technology has value as a security feature. Further, 3D holograms are limited in the depth that they can display with clarity and sharpness. Substituting a 'deep' hologram background with a lenticular version can enhance the perception or illusion of depth even though it is actually only on a single plane. The lenticular image can be created by computer, photographic means or from a graphic design.

One of the criticisms made of lenticular imagery is that the lens has a thickness which can make the structure unsuitable for label products as it stands proud of the product onto which is attached. Embodiments of the technique we describe allow lenticular imagery to be recorded holographically and this can then be applied as a thin security label.

Figure 3:
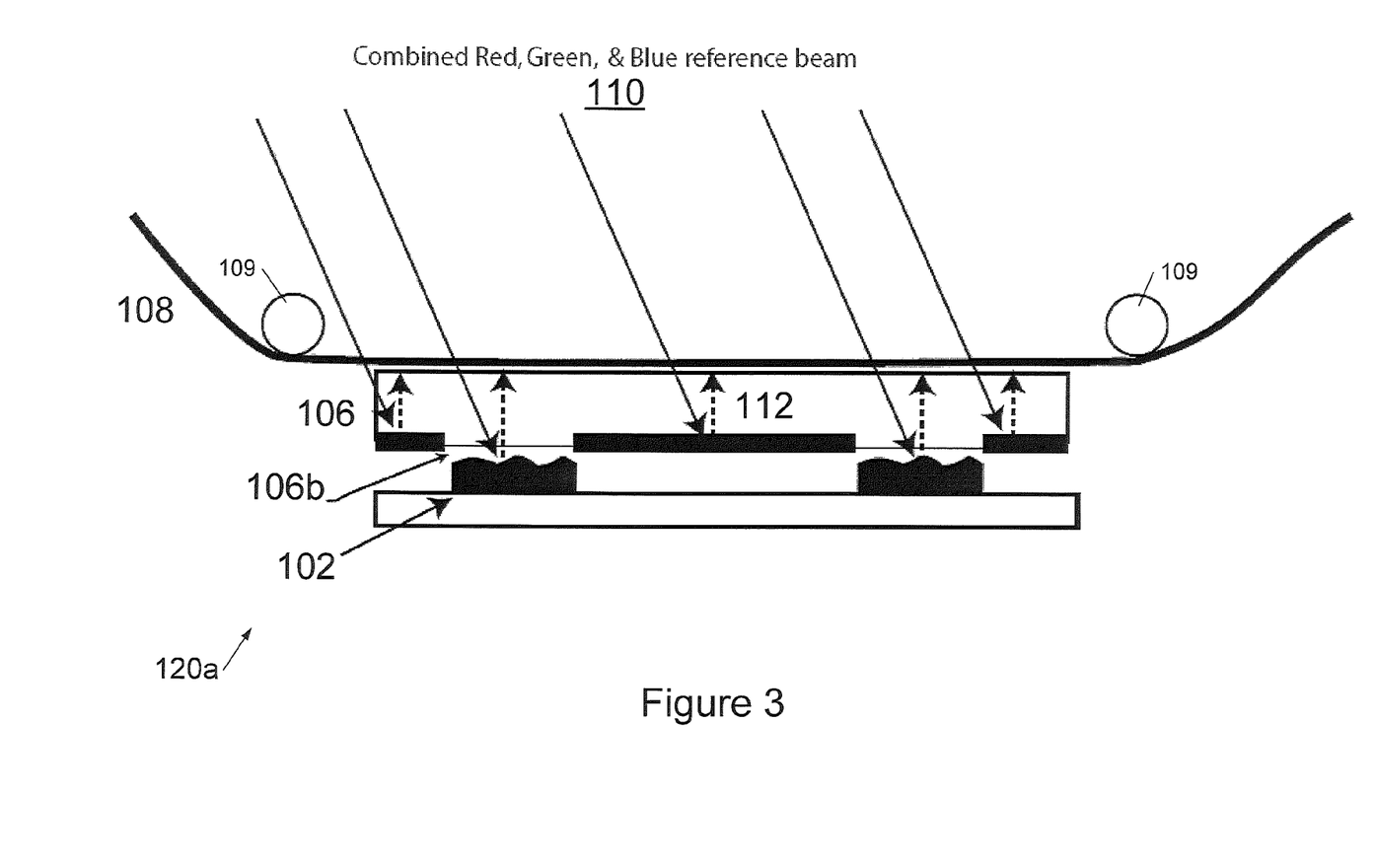
FIG. 3 shows a vertical cross-section through an embodiment of holographic film recording apparatus according to an aspect of the invention illustrating a layout of interchangeable image elements.
Figure 4:
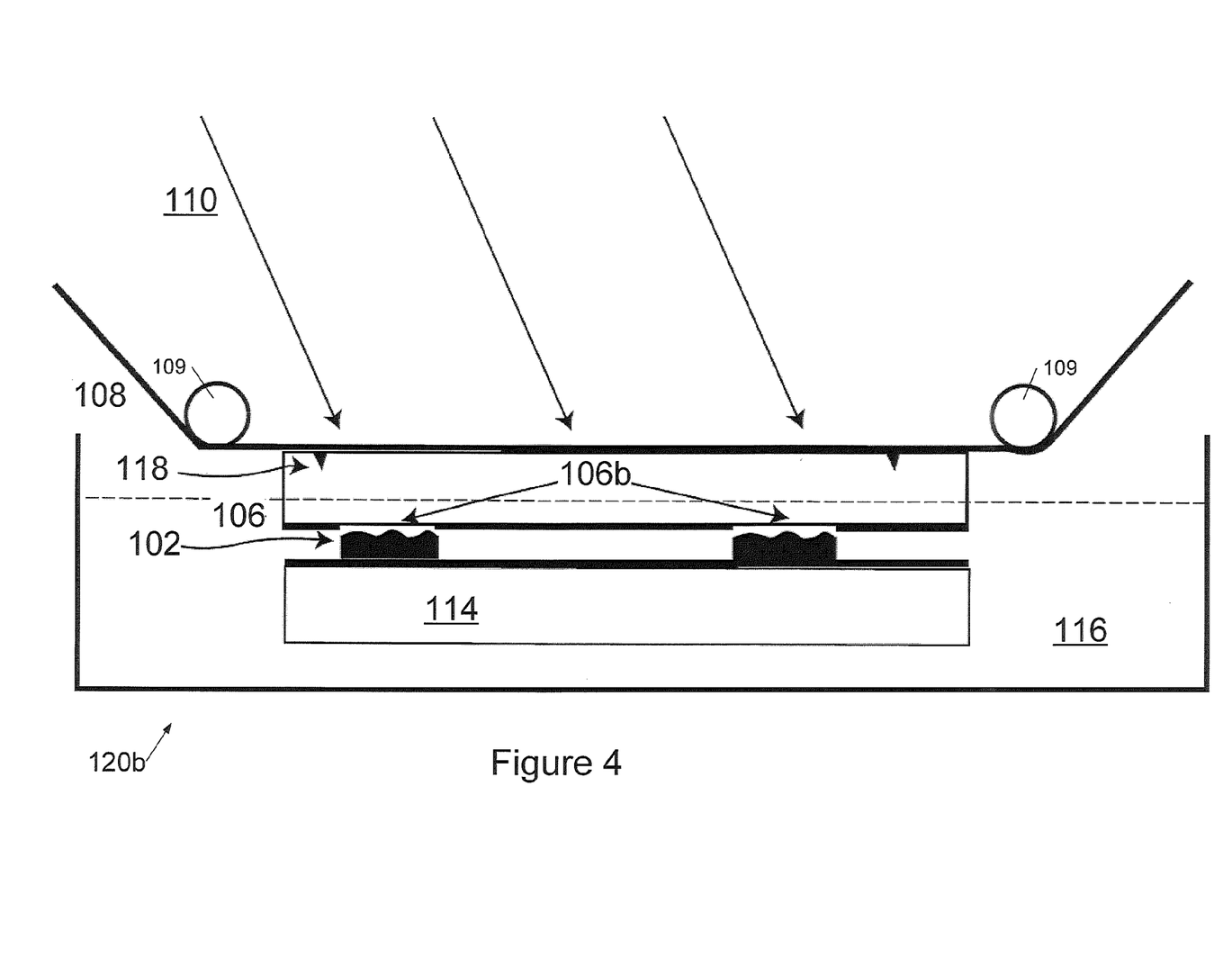
FIG. 4 shows a second embodiment of recording apparatus according to an aspect of the invention in which image elements are in contact.

Referring now to FIG. 3, this shows a first example 120a of holographic film recording apparatus according to an embodiment of the invention, in which like elements to those of FIG. 1 are indicated by like reference numerals. The apparatus of FIG. 3 shows the transparent apertures 106b in the hologram plate 106 (or other multi-channel optical element). As indicated in FIG. 3 the apparatus includes a film transport mechanism 109. Referring now to FIG. 4, this shows a second example 120b of recording apparatus, similar to the apparatus of FIG. 3, in which like elements are indicated by like reference numerals.

Figure 5:
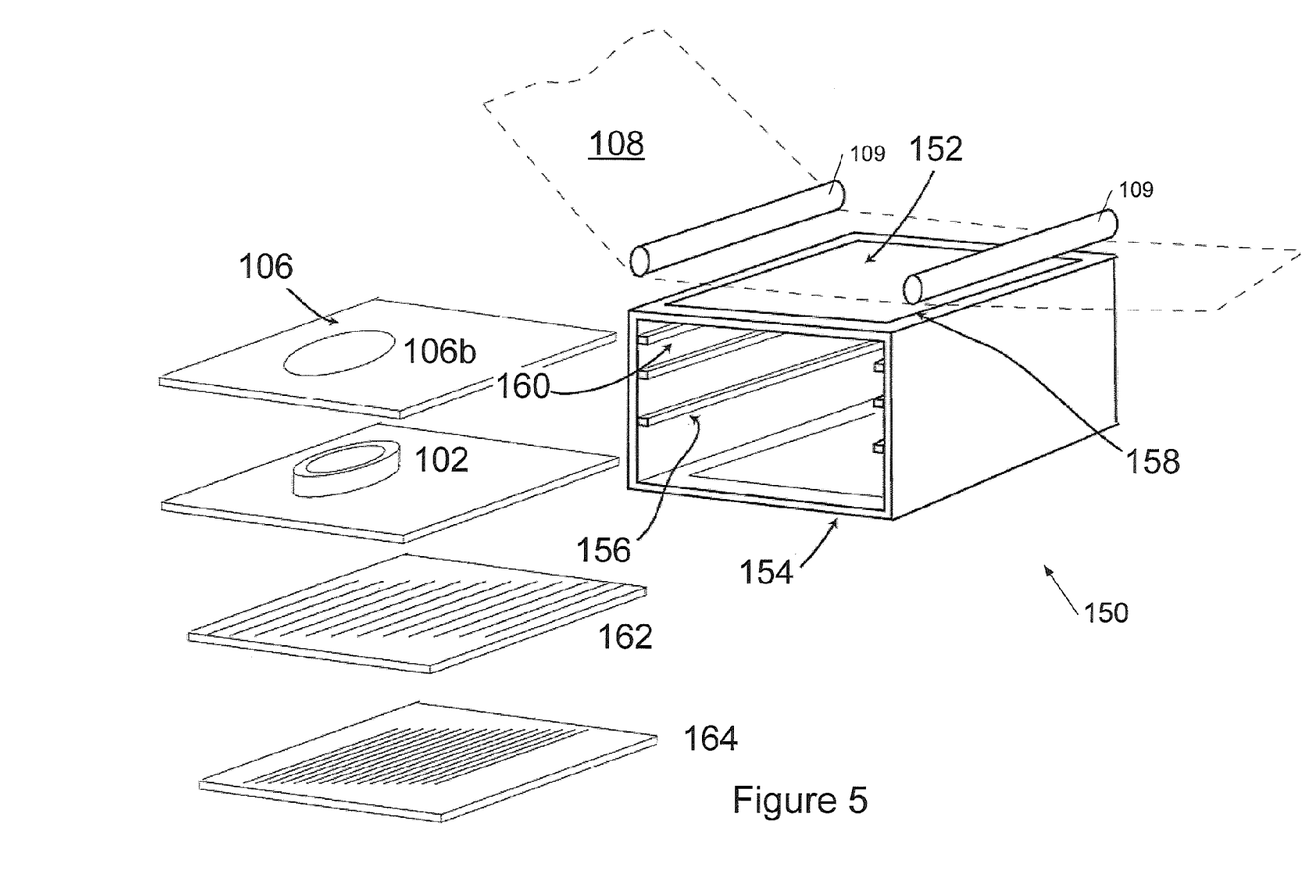
FIG. 5 shows a perspective view of a modular master hologram stack according to an embodiment of an aspect of the invention.

The apparatus of FIG. 4 includes a vacuum channel 118 for holding film 108 flat during a hologram-recording exposure. The system of FIG. 4 also includes a second multi-channel optical element 114 below bas-relief elements 102. Again this may comprise a volume reflection hologram or a lenticular image forming device. Preferably in such an arrangement the system is at least partly immersed in a tank or reservoir of index matching or coupling liquid 116. As previously described, multi-channel optical element 106 may likewise comprise either a volume reflection hologram or a lenticular device. Referring now to FIG. 5, this shows a perspective view of a modular interchangeable image element stack unit 150, again with like elements to those previously described indicated by like reference numerals.

The unit 150 has an aperture 152 in an upper surface and a film holding system 158 such as a vacuum channel to hold the film 108 flat. The unit includes a plurality of support runners 156, 160, preferably one or more of these being vertically adjustable. In this way optical elements such as H2 plate 106 may be slid onto the runners within the unit. The optical elements may include none, one or more of: a volume reflection hologram, a lenticular image forming device 162, a digital light modulator, for example a liquid crystal spatial light modulator 164, and optionally other single- or multi-channel or animated optical elements including an embossed hologram. Preferably the unit incorporates a transparent base 154 to facilitate back lighting, for example with an coherent object beam split from the copying reference laser beam. As illustrated the unit is open on one face but in preferred embodiments a sealable cover is provided including a fluid port to allow the unit to be filled with index matching or coupling fluid as previously described.

Figure 6:
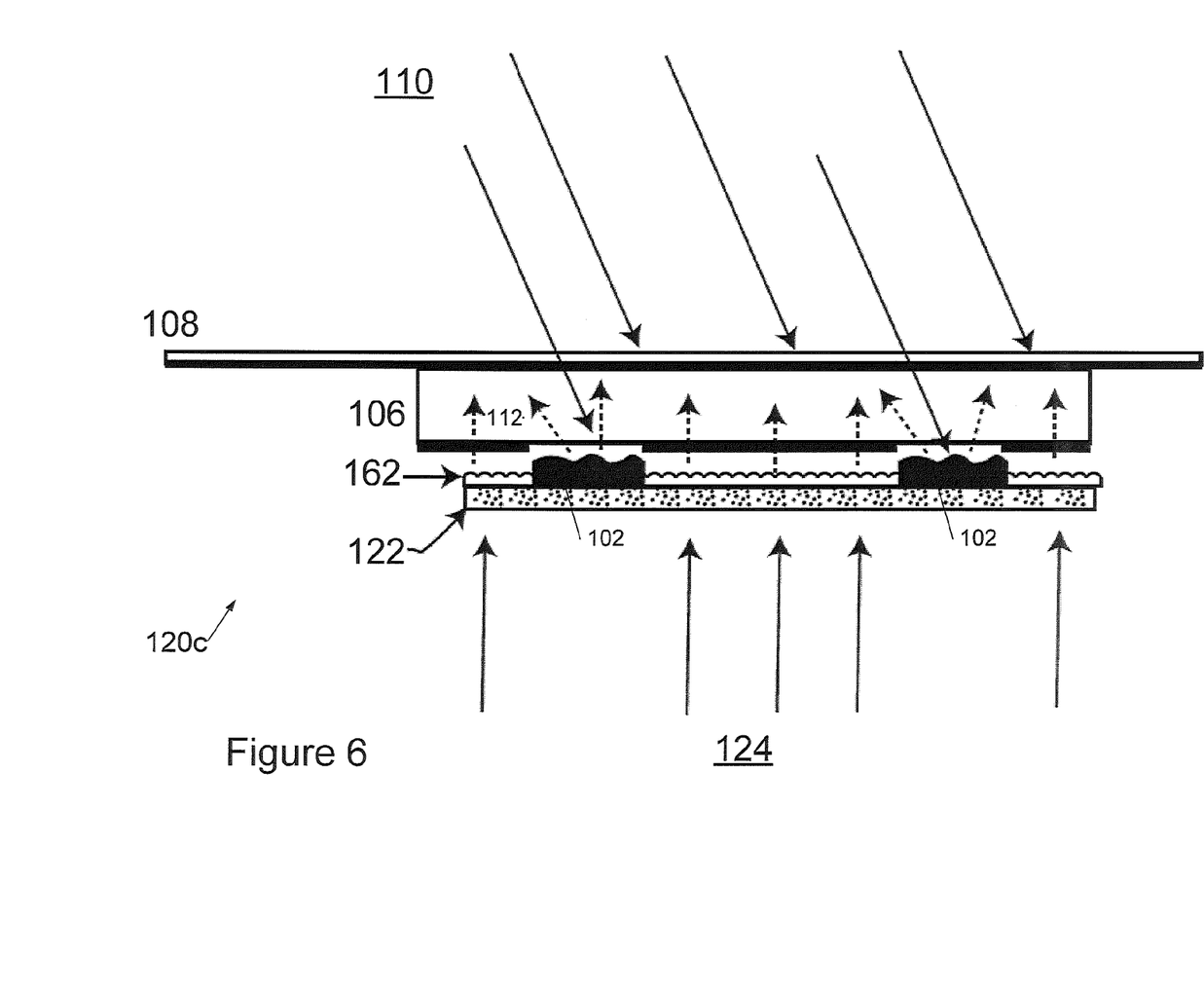
FIG. 6 shows a further embodiment of hologram recording apparatus according to an aspect of the invention, the apparatus including a multi-channel lenticular element.

FIG. 6 shows a further example 120c of hologram recording apparatus according to an embodiment of the invention, in this example including a lenticular screen 162 either below the object 102 or, as shown, in substantially the same plane as the objects, the objects being set into the screen 162. As illustrated an optical diffuser 122 is also provided and the system, in operation, may thus be illuminated by an object beam 124. Again, preferably the object beam comprises red, green and blue laser beams and in embodiments this is split from the reference beam so that the object and reference are coherent.

Figure 7:
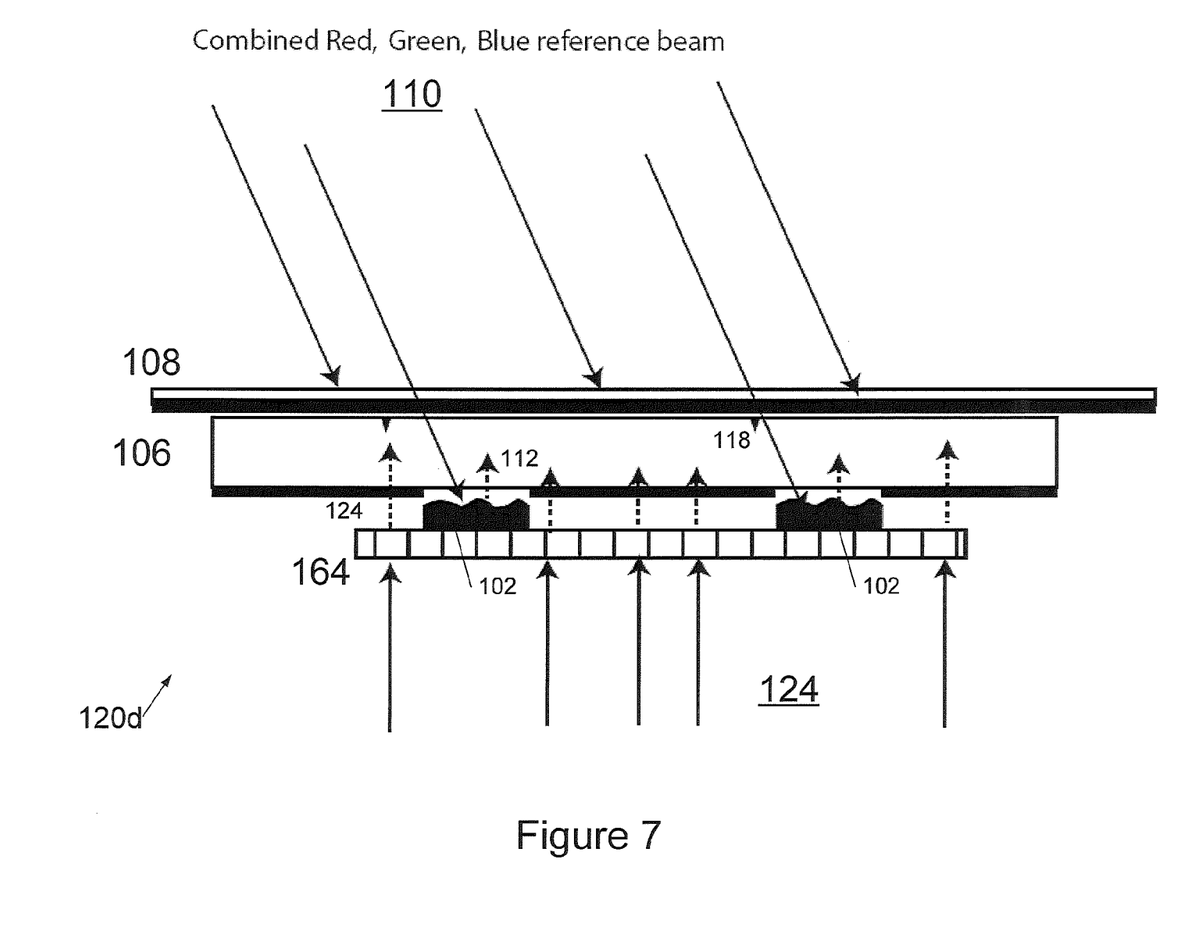
FIG. 7 shows a further embodiment of recording apparatus according to an aspect of the invention, the apparatus including a spatial light modulator and a bas-relief model.

FIG. 7 shows a further example 120d of apparatus along the lines previously described again with like elements indicated by like reference numerals. The apparatus of FIG. 7 includes a spatial light modulator 164 such as an LCD (liquid crystal display) screen, light rays 124 transmitted through this impinging on film 108 to enable an image displayed on the LCD screen to be incorporated within the film volume hologram.

Thus embodiments of the systems we have described are able to produce a mass produced 'H3' type hologram using a hologram and optionally other image-forming components to provide an image which has the advantages of both an exceptionally wide angle of view and high brightness as well as image switching. In embodiments other useful image qualities may also be provided such as full and stable colour, individual enumeration, and image depth including real images projecting from the surface of the final film carrier.

No doubt many other effective alternatives will occur to the skilled person and it will be understood that the invention is not limited to the described embodiments but encompasses modifications apparent to those skilled in the art lying within the spirit and scope of the claims appended hereto.

The invention claimed is:

1. A modular master hologram stack comprising:
a holder configured for interchangeable support of at least two multichannel image generation devices,
a reservoir to contain refractive index matching fluid between said multichannel image generation devices,
a support for at least one three-dimensional (3D) object or hologram of a 3D object beneath said multichannel image generation devices;
wherein the modular master hologram stack is configured to record a holographic image onto holographic recording film, said holographic image comprising a hologram of a 3D object in conjunction with a multi-channel holographic image, the method comprising:
forming a holographic recording stack by:
positioning said holographic recording film over said multichannel image generation device;
positioning said at least one 3D object or hologram of a 3D object under said multichannel image generation device; and
providing a transparent window in said multichannel image generation device in a region above said at least one object; and then
recording said holographic image in said holographic recording film by illuminating said stack through said holographic recording film with a laser light of at least one wavelength.

2. A modular master hologram stack comprising:
a holder configured for interchangeable support of at least two multichannel image generation devices;
a reservoir to contain refractive index matching fluid between said multichannel image generation devices; and
a support for at least one 3D object or hologram of a 3D object beneath said multichannel image generation devices.

3. A modular master hologram stack as claimed in claim 2 wherein at least one of said multichannel image generation devices comprises a multichannel volume reflection hologram.

4. A modular master hologram stack as claimed in claim 2 further comprising a film holder above said multichannel image generation devices to hold holographic recording film substantially planar and motionless to less than 100 nm for a period of at least one millisecond.

5. A modular master hologram stack as claimed in claim 2 wherein a total height of said stack is less than 1 cm.

6. A modular master hologram stack as claimed in claim 2 wherein said multichannel image generation devices have substantially transparent regions above said at least one 3D object or hologram of a 3D object.

* * * * *